United States Patent Office 3,341,500
Patented Sept. 12, 1967

3,341,500
COPOLYESTER PRODUCT
Eckhard Christian August Schwarz, Grifton, N.C., assignor to E. I. du Pont de Nemours and Company, Wilmington, Del., a corporation of Delaware
No Drawing. Filed June 30, 1964, Ser. No. 379,393
4 Claims. (Cl. 260—75)

This invention relates to a novel class of copolyesters, and to fibers, films, and other shaped articles produced therefrom.

Fibers of polyethylene terephthalate have achieved wide commercial usage in a great variety of applications because of a particularly advantageous combination of physical properties. Frequently, however, it has been desired to improve one or more of these properties to gain superior performance in certain applications. For example, a higher modulus would be advantageous for industrial yarns, seat belts and other end use products where a low degree of stretchability and a high recovery are required. While copolyesters, i.e. as obtained by the substitution of a portion of the repeating ethylene terephthalate units by other units, have heretofore enabled improvements in certain properties such as dyeability, such has been frequently accompanied by loses in other properties, notably modulus and recovery.

In accordance with the present invention, novel copolyesters have been found which can be formed into fibers of increased modulus and recovery as compared to homopolymeric polyethylene terephthalate. For the most part these copolyester fibers also exhibit enhanced dyeability and yet retain other desirable physical properties of polyethylene terephthalate fibers.

The novel copolyesters of the invention are derived from ethylene glycol with a mixture of 90 to 99 mol percent terephthalic acid and 10 to 1 mol percent 2,3,5,6-tetramethylterephthalic acid. In fiber form they will have an intrinsic viscosity of at least 0.3, as measured in solution at 25° C. in one part by volume of trifluoroacetic acid and three parts by volume of methylene chloride. The invention, however, also contemplates films and other shaped articles prepared from these novel copolyesters.

The novel polymers of the invention may alternatively be characterized as linear random copolyesters having recurring units consisting essentially of those represented by the formulas:

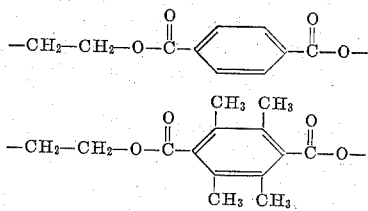

wherein the ratio of the units is within the range of 90/10 to 99/1, respectively. In a preferred embodiment of the invention, the ratio of the above units will be within the range of 95/5 to 98/2, respectively.

The novel copolyesters of the invention are preferably formed from a mixture of monomeric components including bis($\beta$-hydroxyethyl)-2,3,5,6 - tetramethylterephthalate. The tetramethylterephthalic acid and its corresponding dimethyl esters are too sterically hindered to readily undergo direct condensation or ester-interchange in the conventional manner. This bis-$\beta$-hydroxyethyl esters of the two acids may be conveniently first formed and then reacted in the desired mol percentages using a polymerization catalyst such as antimony trioxide, litharge, and the tetra-alkyl titanates, e.g. tetraisopropyl titanate. Alternatively, the bis($\beta$-hydroxyethyl)-2,3,5,6- tetramethylterephthalate may be copolymerized with ethylene glycol and dimethyl terephtalate using an ester-interchange catalyst in addition to a polymerization catalyst. Suitable ester-interchange catalysts are manganeous acetate, calcium acetate, and sodium methoxide. Other lower alkyl esters, phenyl esters, etc. of terephthalic acid can be used in place of the dimethyl terephthalate. Similarly, other equivalent methods, such as using ethylene oxide in the place of ethylene glycol, can be employed so long as the end product copolyester has the composition essentially derived from ethylene glycol, terephthalic acid, and 2,3,5,6-tetramethylterephthalic acid.

The polyesters of the invention may have polymer melt temperatures somewhat lower than that of homopolymeric polyethylene terephthalate depending upon the percentage of the respective discarboxylic acid constituents. Substantially higher molecular weights and accordingly higher polymer melt temperatures may be obtained, however, by employing solid phase polymerization procedures.

In some instances fibers of the copolyesters of the invention will have modulus values as much as 50% or more above those of a polyethylene terephthalate fiber. These same copolyester fibers will exhibit a substantially improved dye rate with disperse dyes, have only a nominal increase in boil off shrinkage, and yet retain tenacity and elongation properties comparable to those of polyethylene terephthalate.

The novel copolyesters are thus well suited to a variety of applications. They can be readily melt spun into filaments or cast from solutions to form self-supporting films. The substantially improved modulus properties of the filaments make them particularly advantageous for use in V-belt reinforcement, fire hose, cordage, sewing thread, sail-cloth, etc.

The expression "polymer melt temperature" employed with respect to the products of this invention is the minimum temperature at which a sample of the polymer leaves a wet molten trail as it is stroked with moderate pressure across a smooth surface of a heated metal. "Polymer melt temperature" has sometimes in the past been referred to as "polymer stick temperature."

The term "intrinsic viscosity," as used herein, is defined as the limit of the fraction $$\frac{\ln(r)}{c}$$

as $c$ approaches 0, where $(r)$ is the relative viscosity, and $c$ is the concentration in grams per 100 ml. of solution. The relative viscosity $(r)$ is the ratio of the viscosity of a solution of the polymer in a mixture of 1 part trifluoroacetic acid and 3 parts methylene chloride (by volume) to the viscosity of the trifluoroacetic acid/methylene chloride mixture, per se, measured in the same units at 25° C. Intrinsic is a measure of the degree of polymerization.

In the examples, values of tenacity in g.p.d., elongation in percent, and initial modulus in g.p.d. (all expressed as "T/E/Mi") are determined upon copolyester fibers which have been spun and drawn as indicated. Measurements are made before and after a finishing procedure which comprises the consecutive steps of:

(a) Heat treating the filaments by boiling them in water for 15 minutes while allowing 3% shrinkage in length, (b) Heating the filaments in an oven at 180° C. for 3 minutes, again allowing 3% shrinkage in length, (c) Heat treating the filaments by boiling them in water for 15 minutes while allowing 1% shrinkage in length, and finally (d) air drying the filaments.

The disperse dye test referred to in the examples is indicative of the rate at which the fibers will accept a dye. According to the test the fibers are dyed employing an aqueous bath containing 20% (based on the weight of the fiber) of a yellow disperse dye comprising 3'-hydroxyquinophthalone at 100° C. for 90 minutes, using a 1000 to 1 ratio of bath to fiber. Fibers of the novel copolyester of the invention yield a medium shade of yellow, markedly deeper than fibers of unmodified polyethylene terephthalate control yarn dyed under the same conditions. Fiber samples removed from the dye bath at intervals of 9, 16 and 25 minutes are rinsed, dried, and then analyzed quantitatively for percentage dye adsorbed by extracting the dye with hot chlorobenzene and determining the amount of dye spectrophotometrically. A plot of the amount of dye adsorbed per gram of fiber vs. the square root of time shows the dye rate (slope of the line connecting the points) which is then compared with the dye rate of polyethylene terephthalate.

This invention is further illustrated, but is not intended to be limited, by the following examples in which parts and percentages are by weight, unless otherwise specified.

EXAMPLE I

A standard polymer tube was charged with bis($\beta$-hydroxyethyl)terephthalate (31.0 g., 0.122 mol), bis($\beta$-hydroxyethyl) - 2,3,5,6 - tetramethylterephthalate (1.90 g., 0.0061 mol), and Sb$_2$O$_3$ (9.0 mg.). The tube was heated at 275° C. at atmospheric pressure for 45 minutes. By this time 4.1 ml. of ethylene glycol had distilled out. Vacuum was gradually applied to 0.3 mm. Hg and the temperature raised to 285° C. for 2 hours. The resulting polymer had a polymer melt temperature of 220° C. and an intrinsic viscosity of 0.60. The polymer contained 95 mol percent of terephthalate units and 5 mol percent of 2,3,5,6-tetramethylterephthalate units.

EXAMPLE II

Into a standard polymer tube were placed bis($\beta$-hydroxyethyl) - 2,3,5,6 - tetramethylterephthalate (1.90 g., 0.0061 mol), dimethylterephthalate (23.8 g., 0.122 mol), ethylene glycol (15 ml.), Sb$_2$O$_3$ (9.0 mg.), manganous acetate (14.0 mg). The mixture was heated in a Wood's metal bath at 195° C. for 1½ hours and during this period 4.8 ml. of methanol was evolved. The temperature was then gradually raised to 285° C., while the pressure was reduced to 0.3 mm. Hg. Polymerization was continued under vacuum for 4 hours. The crystalline polymer so obtained had a polymer melt temperature of 220° C. and an intrinsic viscosity of 0.65. The polymer contained 95 mol percent of terephthalate units and 5 mol percent of tetramethylterephthalate units.

EXAMPLE III

The procedure of Example II was repeated to obtain a series of copolyesters containing varying proportions of terephthalate and 2,3,5,6-tetramethylterephthalate units. A control sample, similarly prepared, was a homopolymer of ethylene glycol and terephthalic acid.

Fibers were melt spun from the various polymers, drawn in length over a heated shoe, and various properties measured thereon. Data obtained from the samples are as follows:

The following method can be employed to produce bis - ($\beta$ - hydroxyethyl)-2,3,5,6-tetramethylterephthalate monomer:

(a) *Chloromethylation of durene.*—A 3-liter, 3-neck flask was charged with

| | |
|---|---|
| Durene | g-- 100 |
| Zinc chloride | g-- 120 |
| Paraformaldehyde | g-- 120 |
| Conc. hydrochloric acid (36%) | ml-- 600 |

The mixture was rapidly stirred on the steam bath for 18 hours under reflux and then cooled to 10° C. A creamy layer separated on top of the liquid. After decanting the liquid, the solids were washed with water twice and then with acetone. After filtering off the acetone, bis(chloromethyl)durene was obtained as a fine dry powder, M.P. 182° C.

(b) *Acetylation and hydrolysis of bis(chloromethyl)-durene.*—A 115–2 g. sample of bis(chloromethyl)-durene (0.50 mol) was heated to the boil in 2 liters of acetic acid containing 100 ml. of water and 150 g. (1.1 mol) of sodium acetate under stirring, until a clear solution resulted. The mixture was refluxed for another two hours, and then poured into 4 liters of water. The precipitate formed was filtered off and washed with water until neutral.

The washed acetate was placed in a 3-neck, 3-liter flask and stirred under reflux in an aqueous solution containing 80 grams of sodium hydroxide for 6 hours. After cooling, the glycol product was filtered off, washed with cold water and dried; M.P. 162° C. Formation of the hydroxy compound was confirmed by infrared spectroscopy by the disappearance of the carbonyl-band at 1725 cm.$^{-1}$ and the appearance of a strong hydroxyl-band at 3500 cm.$^{-1}$.

(c) *Oxidation of bis(hydroxymethyl)durene.*—50 grams of bis(hydroxymethyl)durene were refluxed in 500 ml. dioxane containing 50 ml. of water, 50 ml. of conc. nitric acid and 0.5 gram of sodium nitrile. After 1½ hours, the reaction mixture was condensed to 100 ml. by evaporating solvent and nitric acid under aspirator vacuum, the temperature of the solution was between 60 and 70° C. At the end of evaporation, the reaction became strongly exothermic, with the temperature rapidly rising to 90° C.

At this point, distillation was stopped, and the reaction mixture was poured into one liter of water containing 40.0 grams of sodium hydroxide. The aqueous solution was filtered and then acidified by slowly adding 50% aqueous hydrochloric acid under vigorous stirring. The 2,3,5,6-tetramethylterephthalic acid precipitate so formed was filtered off, washed, and recrystallized from 1500 ml. of water.

(d) *Preparation of tetramethylterephthaloyl chloride.*—50 grams of 2,3,5,6-tetramethylterephthalic acid was dissolved in 100 ml. of thionyl chloride and refluxed for 2 hours on the steam bath, after which the thionyl chloride was distilled off under aspirator vacuum. The residue was recrystallized from n-hexane, M.P. 123° C.

(e) *Preparation of bis($\beta$-hydroxyethyl)-2,3,5,6-tetramethylterephthalate.*—10 grams of tetramethylterephthaloyl chloride was dissolved in 200 ml. of ethylene

| Ratio of terephthalate/tetramethyl terephthalate, mol percent | 100/0 | 98/2 | 95/5 | 90/10 |
|---|---|---|---|---|
| Polymer melt temperature | 260 | 235 | 220 | 200 |
| Denier | 8.6 | 10.0 | 13.6 | 19.4 |
| Intrinsic viscosity | 0.57 | 0.54 | 0.61 | 0.60 |
| Spinning Temp., ° C | 285 | 265 | 265 | 240 |
| Draw Ratio | 4.5X | 4.6X | 4.8X | 5.0X |
| Draw (Heated Shoe) Temp., ° C | 115 | 84 | 103 | 103 |
| T/E/Mi: | | | | |
| Before finish | 4/19/119 | 3.2/34/137 | 4.2/20/158 | 3.9/18/160 |
| Finished | 3.6/27/61 | 2.9/27/73 | 3.5/26/99 | 3.1/30/85 |
| Disperse Dye Rate (relative to homopolymer) | 1 | 1.4 | 1.4 | 2.6 | glycol and heated to reflux temperature for 30 minutes. The reaction mixture was then poured into 600 ml. of ice-water, the precipitate formed was collected on a filter and recrystallized from n-propanol, M.P. 195° C.

As many widely different embodiments of this invention may be made without departing from the spirit and scope thereof, it is to be understood that this invention is not to be limited to the specific embodiments thereof except as defined in the appended claims.

What is claimed is:

1. The linear random copolyester of ethylene glycol with a mixture of 90 to 99 mol percent terephthalic acid and 10 to 1 mol percent 2,3,5,6-tetramethylterephthalic acid.

2. A linear randon copolyester consisting essentially of recurring units represented by the formulas:

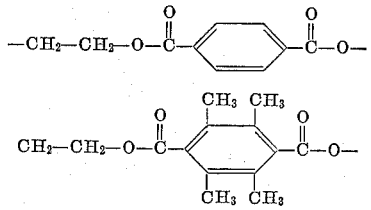

wherein the ratio of said units is within the range of 90/10 to 99/1, respectively.

3. The copolyester of claim 2 wherein the ratio of said units is within the range of 95/5 to 98/2, respectively.

4. Fibers of the linear copolyester as defined in claim 1 and having an intrinsic viscosity of at least 0.3, as measured in solution at 25° C. in one part by volume of trifluoroacetic acid and three parts by volume of methylene chloride.

References Cited

UNITED STATES PATENTS 2,806,877  9/1957  Koenecke et al. _____ 260—75
2,856,375  10/1958  Mikeska _____ 260—75

OTHER REFERENCES

Bjorksten et al., "Polyesters and Their Applications," p. 209. Copyright 1956.

WILLIAM H. SHORT, *Primary Examiner.*

SAMUEL H. BLECH, *Examiner.*

R. LYON, *Assistant Examiner.*